United States Patent [19]

Schrader

[11] 4,171,533

[45] Oct. 16, 1979

[54] LOW VOLTAGE PROTECTION CIRCUIT FOR INDUCTION MOTORS

[75] Inventor: Paul D. Schrader, Louisville, Ky.

[73] Assignee: General Electric Company, Louisville, Ky.

[21] Appl. No.: 889,327

[22] Filed: Mar. 23, 1978

[51] Int. Cl.² ............................................. H02H 7/09
[52] U.S. Cl. ..................................... 361/22; 219/509;
361/33; 361/58; 361/92; 361/106
[58] Field of Search ................. 361/106, 105, 103, 22,
361/34, 31, 32, 33, 92, 58, 154, 211, 23; 337/77,
83, 100, 102, 103, 105; 318/459, 434, 178, 331,
394; 219/491, 507, 509, 329, 240

[56] References Cited

U.S. PATENT DOCUMENTS

| | | | |
|---|---|---|---|
| 2,483,515 | 10/1949 | Alexander | 361/32 |
| 3,246,210 | 4/1966 | Lorenz | 361/211 |
| 3,354,374 | 11/1967 | Barry | 361/105 X |
| 3,619,722 | 11/1971 | Gill et al. | 361/22 |
| 3,681,569 | 8/1972 | Schwarz | 337/103 X |
| 3,718,839 | 2/1973 | Conti et al. | 361/92 |
| 3,805,021 | 4/1974 | Griffin | 219/509 X |
| 3,946,574 | 3/1976 | Portera | 62/158 |

Primary Examiner—Patrick R. Salce
Attorney, Agent, or Firm—Frank P. Giacalone; Radford M. Reams

[57] ABSTRACT

A low voltage protection circuit for an air conditioner compressor which employs a series of diodes to control the application of an a.c. source potential to the resistive heater element of a conventional thermally responsive switch. The diode circuit maintains the heater element directly across the source potential at all times when the thermally responsive switch is open, but only during alternate half-cycles of the source potential when the thermally responsive switch is closed to thereby protect the compressor against potentially damaging low voltage conditions while reducing the power consumed by the heater element during periods of normal source voltage level.

3 Claims, 2 Drawing Figures

LOW VOLTAGE PROTECTION CIRCUIT FOR INDUCTION MOTORS

BACKGROUND OF THE INVENTION

This invention relates generally to low voltage protection circuits for induction motors such as air conditioner compressors and the like.

Generally speaking, such circuits have been known and used in the prior art. FIG. 1 of the attached drawings illustrates one such conventional low voltage protection circuit wherein an air conditioner compressor motor 10 is connected through a manually operable on/off switch 12, an adjustable thermostatically controlled switch 14 and a thermally activated low voltage protector switch unit 16 to a suitable source 18 of a.c. potential. The switch unit 16 includes a heat sensitive switch 20 thermally coupled to a heater element 22, the latter being connectable directly across the source 18. Now, when the air conditioner is connected to the source 18, the element 22 draws power therefrom and is selected so as to heat up sufficiently to activate the thermally sensitive switch 20 to close the same provided the source potential is at least high enough to safely operate the compressor motor 10. However, should the source potential drop below the safe operating level for the motor 10 for any reason, the current drawn by the element 22 will also drop to thus reduce its heat output sufficiently to deactivate and open the switch 20. The motor 10 is thereby protected against possible damage which might otherwise result if a low voltage condition occurs at the source 18 sufficient to stall the motor 10 and produce damaging locked rotor current.

One difficulty which has been encountered with such prior art circuits results from the fact that the heater element is directly connected across the source at all times while the air conditioner is so connected. This is the case whether or not the air conditioner is turned on and whether or not the thermostat is calling for compressor operation. The load thus presented by the heater element upon the source is constant and can produce a significant amount of power consumption over long periods of time just to keep the low voltage protection switch activated.

By means of my invention, this and other difficulties encountered in the prior art can be substantially overcome.

SUMMARY OF THE INVENTION

It is one object of the present invention to provide an improved low voltage protection circuit for induction motors.

It is another object of the present invention to provide a low voltage protection circuit for air conditioner compressors and other induction motors which substantially reduces the power drain on the commercial power source compared with that caused by conventional prior art low voltage protection circuits.

Briefly, in accordance with the present invention, there is provided an improved low voltage protection circuit for an a.c. motor of the type having first switching means for applying a source of a.c. potential across the motor when activated, and resistance means operatively associated with the first switching means for activating the latter when current therethrough is at least equal to a minimum value. The improvement includes second switching means for connecting the resistance means across the source during each half-cycle of the source potential when the first switching means is inactive, and for connecting the resistance means across the source during alternate half-cycles of the source potential when the first switching means is activated.

These and other objects of the present invention will become apparent to those skilled in the art from the following detailed description and attached drawings upon which, by way of example, only the preferred embodiment of the subject invention is illustrated.

BRIEF DESCRIPTION OF THE DRAWINGS

FIG. 1 shows a schematic diagram of a typical prior art low voltage protection circuit for an a.c. induction motor, air conditioner compressor or the like.

DESCRIPTION OF THE PREFERRED EMBODIMENT

Figure 2:
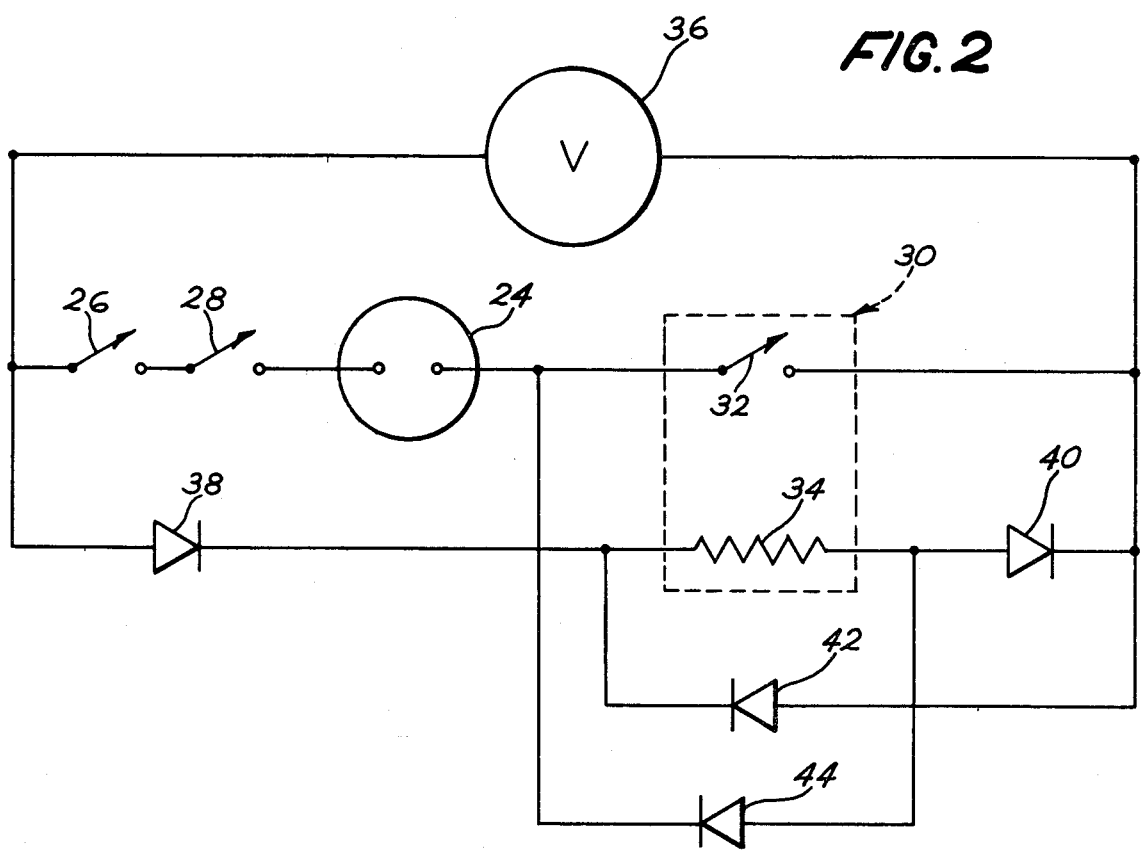
FIG. 2 shows a schematic diagram of an improved low voltage protection circuit for an a.c. induction motor, air conditioner compressor or the like, thus illustrating one preferred embodiment of the present invention.

Referring now to FIG. 2, there is shown, in one preferred embodiment of the subject invention, a low voltage protection circuit for an a.c. motor 24 such as an air conditioner compressor, for example.

Typically, such a compressor motor 24 is controlled by means of a manually operable on/off switch 26 and an adjustable thermostatically controlled switch 28. Protection against potentially motor damaging low voltage is provided by means of a conventional switch assembly 30 having a normally open heat sensitive switch 32 and a resistive heater element 34 thermally coupled thereto. The assembly 30 may be selected such that the switch 32 will be activated from an open condition, as shown, to a closed condition when the heat generated by a current flowing through the element 34 reaches a desired level, such heat being a function of the r.m.s. value of a.c. current flowing therethrough. The series combination of the motor 24 and the switches 26, 28 and 32 is connected across a suitable source 36 of a.c. potential.

Now, in accordance with my invention, a first pair of suitable diodes 38, 40 is connected in series with the heater 34 on opposite sides thereof and the resulting series combination is connected across the source 36 such that, during alternate half-cycles of the source potential, current flows through the diodes 38, 40 and the heater 34, whether the switch 32 is open, as shown, or closed. A second pair of diodes 42, 44 is series connected to and on either side of the element 34, the series combination of which is connected across the switch 32. The polarities of the diodes 42, 44 are reversed with respect to the polarities of the diodes 38, 40 in their relationship to the source 36. Consequently, the diodes 42, 44 conduct only during alternate half-cycles of source potential opposite those which drive the diodes 38, 40 to conduct, and only when the switch 32 is open. When the switch 32 is closed, as when the source potential is at least equal to a safe operating level for the motor 24 and after the element 34 has warmed up sufficiently, the series combination of the diodes 42, 44 and the element 34 is shunted out of the circuit.

Thus, while the element 34 draws full power from the source 36 at all times while the switch 32 is open, the element 34 consumes substantially less power when the switch 32 is closed. Accordingly, the average power consumed by the element 34 during operation of an air conditioner employing such a motor 24 will be substantially less than where the element 34 is directly connected across the source 36 as in prior art low voltage protection circuit of FIG. 1.

Figure 1:
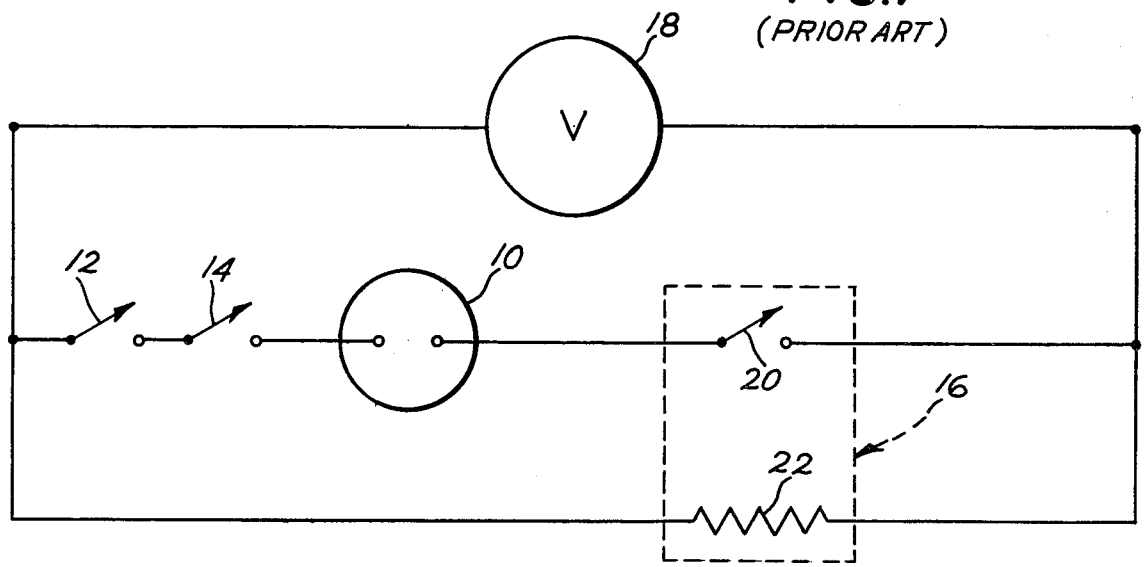

Proper and stable operation of the circuit of FIG. 2 requires that the assembly 30 be selected such that the temperature at which the thermal switch 32 opens is below the temperature generated by the element 34 when the latter is operated under half-wave or half-power conditions, i.e., when the switch 32 is closed, assuming the source potential is within normal limits. For example, a suitable thermal switch for operation in the prior art circuit of FIG. 1 is Model No. 20474F1-40 as manufactured by Texas Instruments, Incorporated which is rated for use with a 230 volt power source at $8\frac{1}{2}$ watts $\pm 1$ watt and 6180 ohms, $\pm 10$ percent. This switch is calibrated to close at 185° F., $\pm 5$ degrees F., and to open at 175° F., $\pm 5$ degrees F. However, in the circuit of FIG. 2, where the source potential is 230 volts, the thermal switch should be selected so as to open at a substantially lower temperature, for example, at about 120 degrees F., to avoid the tendency of the switch 32 to cycle on and off in an unstable manner when the source potential is within normal limits.

Although the subject invention has been described with respect to specific details of a certain preferred embodiment thereof, it is not intended that such details limit the scope of the subject invention otherwise than as set forth in the following claims.

I claim:

1. In an improved low voltage protection circuit for an a.c. motor of the type comprising
   first switching means for applying a source of a.c. potential across said motor when activated, and
   resistance means operatively associated with said first switching means for activating said first switching means when a current through said resistance means is at least equal to a minimum value, the improvement of which comprises second switching means including:
   a first pair of diodes connected to and on each side of said resistance means, the resulting series combination of which is connected across the series combination of said motor and first switching means, for passing a current through said resistance means during each half-cycle of a first polarity of said source potential, and
   a second pair of diodes connected to and on each side of said resistance means, the resulting series combination of which is connected across said first switching means for passing a current through said resistance means during each half-cycle of a second polarity of said source potential when said first switching means is inactive, said second pair of diodes and said resistance means being shunted out of said circuit by said first switching means when the latter is activated.

2. The circuit of claim 1 further comprising
   a manually operable on/off switch for applying said source potential to said motor, and
   a thermostatically controlled switch for applying said source potential to said motor, said motor being an air conditioner compressor.

3. A low voltage protection circuit for an air conditioner compressor comprising
   a manually operable on/off switch,
   an adjustable thermostatically controlled on/off switch,
   a normally open heat activated switch, said switches being connected in series with said compressor for controlling the application of an a.c. source potential across said compressor,
   a heater element thermally coupled to said heat activated switch for generating heat in response to a current flow through said element to close said heat activated switch when said current is at least equal to a preselected minimum value, and
   diode switching means for connecting said element across said source potential at all times when said heat activated switch is open and for connecting said element across said source potential only during alternate half-cycles of said source potential when said heat activated switch is closed.

* * * * *